July 27, 1965 KATSUYA ATSUMI 3,197,210

RECORDING AND BIASING HEAD ASSEMBLY FOR MAGNETIC TAPE RECORDERS

Filed Dec. 17, 1962

INVENTOR
KATSUYA ATSUMI
BY [signature]
ATTORNEY

United States Patent Office 3,197,210
Patented July 27, 1965

3,197,210
RECORDING AND BIASING HEAD ASSEMBLY FOR MAGNETIC TAPE RECORDERS

Katsuya Atsumi, Tokyo, Japan, assignor to Akai Electric Company Limited, Tokyo, Japan, a corporation of Japan Filed Dec. 17, 1962, Ser. No. 245,246
4 Claims. (Cl. 274—4)

The present invention relates to magnetic recording and playback devices of the special type utilizing a magnetic recording element in the form of an elongated tape coated on one side with a layer of magnetic material, more particularly to tape recorders of the type which comprise a pair of physically separated recording and biasing magnets or heads being independently energized, to produce recording and biasing magnetic fields, respectively, acting upon said tape.

The conventional magnetic tape recorders generally utilize a combined recording and direct current or high frequency biasing magnet forming a single unit, or having a common magnetic core, with the recording and biasing currents being superimposed upon one another to produce a composite magnetic recording and biasing flux. In arrangements of this type, and independent control or adjustment of the magnetic fields produced by both currents is greatly limited, whereby to result in poor recording performances, as well as other defects well known. It is for this reason that it has been proposed to provide separate recording and biasing heads disposed in predetermined physically spaced relation to one another and to the magnetic tape, respectively, in an effort to improve the frequency response and other desirable characteristics of the recorder.

Head assemblies of the foregoing character are shown and described in greater detail in my copending patent application Serial No. 178,678 entitled Magnetic Record Head Assembly in Magnetic Tape Recorder, filed March 9, 1962, which prior application is herewith included in the instant application by reference.

The present invention has for its object the provision of an improved construction of a recording and biasing head assembly of the referred to type, to increase both the operating efficiency and reliability of the recorder during the useful life thereof.

According to the prior arrangements disclosed for instance by the referred to copending application, both heads are disposed opposite to one another at a predetermined distance. Under certain conditions, the oppositely arranged heads may be offset relative to one another as viewed in the running direction of the tape, or the heads may be inclined to one another in a common plane and about a common line passing through the centers of the heads. The object of these arrangements is to reduce or minimize the disadvantageous and undesirable erasure of the recorded information, especially of the high frequency components thereof, on the tape during the passage of the latter through the trailing region of the biasing magnetic field set up by the biasing head, in such a manner as to improve the high frequency response and in turn the all over performance of the recorder, in a manner explained in greater detail in the referenced copending application.

In order to achieve optimum recording performance by a recorder of the type afore-mentioned, it is necessary to maintain the relative physical position or spacing between the recording and biasing heads, on the one hand, and between the tape and the biasing head, on the other hand, even after prolonged operating periods and during the useful life of a recorder.

In magnetic head assemblies of the referred to type, it has been found advantageous to arrange the magnetic layer of the tape in sliding contact with the surface of the recording head and to project a biasing magnetic field by the biasing head upon the operative or recording region of the tape by way of the rear face of the latter spaced at a predetermined distance from the biasing magnet. Difficulties have, however, arisen in practice with arrangements of this type on account of the unavoidable wear of the record head within the area being in contact with the magnetic layer of the tape. This wear generally amounts to about 2 microns per 100 hours of operation of the recorder, whereby to cause a substantial abrading action on the surface of the magnet, resulting, in turn, in a variation of the effective spacing distance between the heads and a substantial impairment of the operating performance or recording fidelity of the recorder.

Accordingly, an important object of the present invention is the provision of an improved magnetic head assembly for a tape recorder of the referred to type by which a predetermined and critical spacing distance or relative position between the recording and biasing heads will be maintained even after considerable operating periods, despite the inevitable wear of the surface of the recording head caused by the tape during operation.

With this general object in view, the magnetic head assembly according to the present invention is fitted with a wear-resistant separating or spacing strip affixed to and covering a substantial portion of the surface of the biasing head. Advantageously, the width of said strip equals the width of the tape, or it may be smaller under certain circumstances. The material of the strip suitably consists of a wear-resistant woven fabric, such as Nylon, Teflon or a similar synthetic material, although not limited thereto. However, any other suitable material having the requisite resiliency, high resistance to wear and a low friction coefficient, such for instance as a nonmagnetic and hard metal (stainless steel etc.), may be employed for the purposes of the invention.

Another object of the invention is the provision of a multiple head assembly for magnetic tape recorders of the type referred to which is both simple in design and may be manufactured economically or at low cost.

The invention, both as to the foregoing and ancillary objects, will be better understood from the following detailed description, taken in conjunction with the accompanying drawings forming part of this specification and in which:

FIG. 1 diagrammatically illustrates in plan view a recording and biasing head assembly of the referred to type having embodied therein the improvement according to the present invention;

Figure 1:
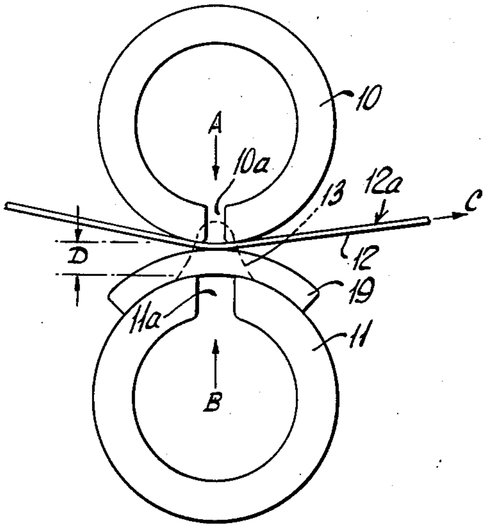
Figure 2:
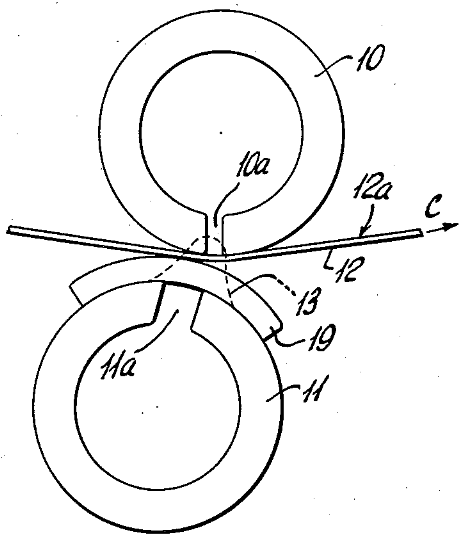
FIG. 2 is similar to and shows a modification of FIG. 1.

Referring more particularly to the drawings, FIGS. 1 and 2, two different arrangements of a recording head or magnet 10, carrying a recording winding (not shown), and a biasing head or magnet 11, carrying a biasing winding (not shown) are depicted diagrammatically in plan view. Numeral 12 denotes the magnetic tape the thickness of which is exaggerated in the drawing and which carries a magnetic layer 12*a*, said tape being moved in known manner across the gap 10*a* of the recording head 10 by following a path indicated by the arrow C in the drawing.

In FIG. 1, both heads 10 and 11 are arranged with their gaps 10*a* and 10*b*, both shown with an exaggerated width, being aligned and spaced by a predetermined distance D, while in FIG. 2 the heads are displaced to include an angle relative to one another, in the manner shown and described by the referenced copending application Serial No. 178,678.

In both arrangements according to FIGS. 1 and 2, the biasing magnetic flux projected by the head 11 intersects the recording flux produced by the record head in the recording region and adjacent to the recording gap 10*a* of the head 10.

As described and explained in greater detail in the above-mentioned copending application, design or adjustment of the proper spacing distance D between the heads 10 and 11, of the widths of the gaps 10*a* and 11*a*, and of the path of the tape 12 having its layer 12*a* moving in contact with the recording magnet, will result in a reduction or complete elimination (see FIG. 2) of the trailing portion of the magnetic biasing field 13 acting upon the tape upon leaving the biasing gap 10*a*, whereby to result in a minimum of erasure of the high frequency components of the signal or information being recorded upon the tape.

Figure 3:
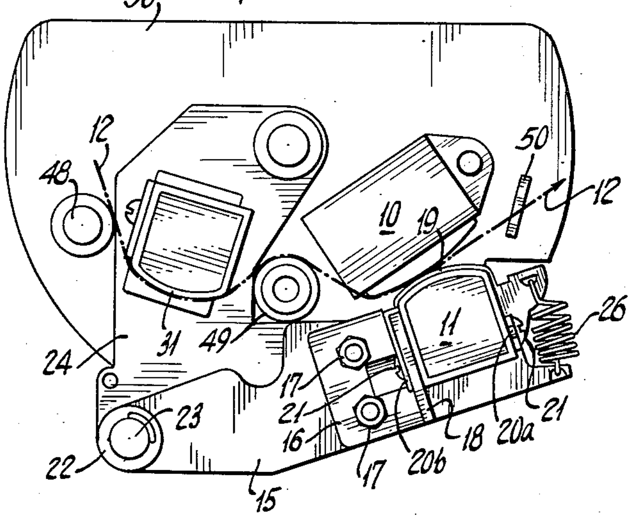
FIG. 3 is a plan view of a preferred structural embodiment of the invention.

In order to maintain constant and optimum biasing conditions, that is, a constant distance D, despite the effects of wear of the surface of the head 10 caused by the magnetic layer 12*a*, there is provided in accordance with the present improvement a wear-resistant spacing member 19 being preferably removably affixed to the biasing head 11, while both heads 10 and 11 are maintained in resilient engagement with the tape and member, respectively, as indicated by the arrows A and B, by the provision of suitable resilient biasing means such as more clearly shown by FIG. 3.

Referring to the latter, a preferred construction of a magnetic head assembly according to the invention is shown by way of example, wherein the biasing head 11 is fixedly mounted upon a mounting plate 15 by means of an angular bracket 16, set screws 17 and mounting screws 18. The wear-resistant spacing strip 19 affixed to the biasing magnet 11 may have a thickness of say 0.3–0.6 mm. and consists of a material of the type described hereinbefore. Furthermore, strip 19 may have a width equal to the width of the tape 12 and overlies a portion of the front surface of the head 11. The strip is advantageously replaceable such as by securing it to the sides of the head 11 by the aid of a pair of pressure plates 20*a*, 20*b* and set screws 21.

Mounting plate 15 has an upright sleeve 22 secured to the end of the plate remote from the head 11. A pivot pin 23 is passed through the sleeve 22 and secured to a corner of a stationary carrier plate 24 in any suitable manner, whereby plate 15 is pivotally supported by the plate 24 which may in turn be secured to a support or base 30. A coil spring 26 being connected between the plates 15 and 24 serves to resiliently urge the biasing head 11 in a direction towards the recording head 10 mounted upon plate 24. The latter, in the example shown, also supports an erase head 31 the working surface of which is positioned along the path of the tape 12, in the manner shown and understood by those skilled in the art.

Figure 4:
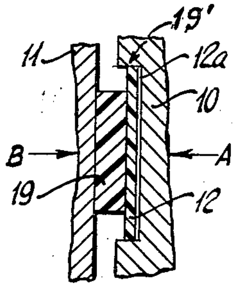
FIG. 4 is a fragmentary cross-section, shown on an enlarged scale, of the recording and biasing head and spacing member, explanatory of the improvement and novel effects obtained by the invention.

As a consequence, the biasing head 11, together with its attached wear-resistant strip 19, exerts a resilient pressure upon the recording head 10 through the intermediary of the tape 12. If the recorder operates during the prolonged period, the tape 12 acts to a more or lesser degree as an abrading or polishing band, whereby to produce a gradually deepening groove or recess 19' in the recording head 10, in the manner shown in FIG. 4 on an exaggerated scale.

In order to prevent the abrading action of the tape from varying the predetermined or fixed distance D between the heads 10 and 11, the latter are maintained in resilient engagement through the strip 19 and the tape 12, passing around suitable guides 48, 49 and 50, in a manner well known. It will be seen, therefore, that when a recess 19' is formed, the strip together with the tape enter said recess, whereby the newly formed working surface of the record head 10 will remain at the same distance D from the biasing head 11. Since the strip 19 consists of a suitable wear-resistant material and the biasing head is maintained under slight resilient pressure in contact with the rear surface of the tape, wear of the strip itself is practically negligible. If the strip should be subjected to some wear after a prolonged operating period, it may be instantly replaced by loosening and re-tightening of the screws 21.

In the foregoing the invention has been described in reference to a specific illustrative device. As will be understood, various changes may be made in the form of details, arrangement and proportion of the parts, etc., without departing from the broader spirit and scope of the invention as set forth in the appended claims.

I claim:

1. In a magnetic tape recorder comprising in combination:

(1) a recording head including a recording gap, (2) a magnetic recording tape having a base and a magnetic layer carried by said base, said tape arranged to move across said gap with said layer in surface contact with said head, (3) a separate biasing head including a biasing gap, and (4) means to maintain said biasing gap at a predetermined fixed and spaced relation to said recording gap comprising (a) a first stationary support carrying one of said heads, (b) a second support relatively movably mounted upon said first support and carrying the other of said heads, (c) a wear-resistant member of predetermined thickness secured to and projecting from said biasing head, and (d) resilient means intervening between said first and said second support, to urge said biasing head and said member into continuous contact with said tape and said recording head.

2. In a magnetic tape recorder as claimed in claim 1, said member consisting of a strip of synthetic plastic removably affixed to the face of said biasing magnet.

3. In a magnetic tape recorder comprising in combination:

(1) a recording head including a recording gap, (2) a magnetic recording tape having a base and a magnetic layer carried by said base, said tape arranged to move across said gap with said layer in surface contact with said head, (3) a separate biasing head including a biasing gap, and (4) means to maintain said biasing gap at a predetermined fixed and spaced relation to said recording gap comprising (a) a first stationary support carrying said recording head, (b) a second support relatively movably mounted upon said first support and carrying said biasing head, (c) a wear-resistant member of predetermined thickness secured to and projecting from said biasing head, and (d) resilient means interveing between said first and said second support, to urge said biasing head and said member into continuous contact with said tape and said recording head.

4. In a magnetic tape recorder as claimed in claim 3, said second support being pivotally mounted upon said first support, and said resilient means being comprised of a tension spring having its ends connected each to one of said supports.

References Cited by the Examiner

UNITED STATES PATENTS

| | | | |
|---|---|---|---|
| 2,703,714 | 3/55 | Demby | 274—11 X |
| 2,813,686 | 11/57 | Schroter | 274—4 X |
| 2,919,866 | 1/60 | Minott | 242—55.13 X |
| 2,932,697 | 4/60 | Bogen et al. | 179—100.2 |

FOREIGN PATENTS

| | | | |
|---|---|---|---|
| 787,594 | 12/57 | Great Britain. | |

NORTON ANSHER, *Primary Examiner.*